United States Patent
Bohling et al.

(10) Patent No.: US 10,479,907 B2
(45) Date of Patent: Nov. 19, 2019

(54) VINYL ACETATE BINDERS IN AN ABOVE-CRITICAL PVC COATINGS COMPOSITION

(71) Applicants: Dow Global Technologies LLC, Midland, MI (US); Rohm and Haas Company, Philadelphia, PA (US)

(72) Inventors: James C. Bohling, Lansdale, PA (US); Junyu Chen, Shanghai (CN); Edwin Nungesser, Horsham, PA (US); Zhen Qian, Anhui (CN); Tao Wang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/329,737

(22) PCT Filed: Jul. 30, 2014

(86) PCT No.: PCT/CN2014/083292
§ 371 (c)(1),
(2) Date: Jan. 27, 2017

(87) PCT Pub. No.: WO2016/015239
PCT Pub. Date: Feb. 4, 2016

(65) Prior Publication Data
US 2017/0210931 A1    Jul. 27, 2017

(51) Int. Cl.
| | | |
|---|---|---|
| *C09D 131/04* | (2006.01) | |
| *C09D 143/02* | (2006.01) | |
| *C09D 141/00* | (2006.01) | |
| *C08F 218/08* | (2006.01) | |
| *C08F 230/02* | (2006.01) | |
| *C08F 228/02* | (2006.01) | |
| *C08K 3/22* | (2006.01) | |
| *C09D 133/14* | (2006.01) | |

(52) U.S. Cl.
CPC .......... *C09D 131/04* (2013.01); *C08F 218/08* (2013.01); *C08F 228/02* (2013.01); *C08F 230/02* (2013.01); *C09D 141/00* (2013.01); *C09D 143/02* (2013.01); *C08K 2003/2241* (2013.01); *C09D 133/14* (2013.01)

(58) Field of Classification Search
CPC .. C09D 131/04; C09D 143/02; C09D 141/00; C08L 31/04; C08L 43/02; C08L 41/00; C08F 18/08; C08F 218/08; C08F 30/02; C08F 230/02; C08F 28/02; C08F 228/02; C09J 131/04; C09J 143/02; C09J 141/00
See application file for complete search history.

(56) References Cited

U.S. PATENT DOCUMENTS

| | | | | |
|---|---|---|---|---|
| 6,492,451 | B1 * | 12/2002 | Dersch | C03C 17/009 524/430 |
| 9,346,970 | B2 | 5/2016 | Bohling et al. | |
| 9,505,944 | B2 | 11/2016 | Bohling et al. | |
| 9,834,697 | B2 * | 12/2017 | Bohling | C09D 133/06 |
| 2002/0118435 | A1 * | 8/2002 | Foulger | G01N 33/54313 359/265 |
| 2008/0269402 | A1 * | 10/2008 | Maurice | C08F 220/14 524/547 |
| 2010/0124614 | A1 | 5/2010 | Wildeson et al. | |
| 2014/0088249 | A1 * | 3/2014 | Daniels | C08F 210/02 524/850 |
| 2015/0112016 | A1 | 4/2015 | Bohling et al. | |
| 2017/0145221 | A1 * | 5/2017 | Xu | C08F 2/24 |
| 2017/0210933 | A1 * | 7/2017 | Bohling | C09D 133/06 |

FOREIGN PATENT DOCUMENTS

| | | | | |
|---|---|---|---|---|
| EP | 0506088 | A2 | 9/1992 | |
| JP | H06128442 | A | 5/1994 | |
| JP | 5340232 | B2 | 11/2013 | |
| WO | 9632450 | A1 | 10/1996 | |
| WO | 2013163808 | A1 | 11/2013 | |
| WO | WO-2013163808 | A1 * | 11/2013 | ............... C08F 2/22 |
| WO | WO-2014/019184 | A1 * | 2/2014 | |
| WO | 2014113411 | A1 | 7/2014 | |
| WO | WO-2016-015192 | A1 * | 2/2016 | |

OTHER PUBLICATIONS

Sigma-Aldrich, Thermal Transitions of Homopolymers, found at https://www.sigmaaldrich.com/technical-documents/articles/materials-science/polymer-science/thermal-transitions-of-homopolymers.html (retrieved Nov. 20, 2018).*
Search report from corresponding European 14898632.6 application, dated Sep. 20, 2017.

* cited by examiner

*Primary Examiner* — Kregg T Brooks
(74) *Attorney, Agent, or Firm* — Reid S. Willis

(57) ABSTRACT

The present invention is an above-critical coating composition comprising an aqueous dispersion of polymer particles, pigment particles, and extender particles wherein the polymer particles comprise from 80 to 99.8 weight percent structural units of vinyl acetate and from 0.1 to 6 weight percent structural units of a phosphorus acid monomer. The composition shows surprisingly improved hiding with increased particle size of the polymer particles.

8 Claims, No Drawings

VINYL ACETATE BINDERS IN AN ABOVE-CRITICAL PVC COATINGS COMPOSITION

BACKGROUND OF THE INVENTION

The present invention relates to a coatings composition comprising a stable aqueous dispersion of vinyl acetate functionalized polymer particles adsorbed to pigment particles in an above-critical pigment volume concentration (PVC) paint formulation.

Coating formulations are complex mixtures of polymers particles (binder), pigments, extenders, and additives. The pigment of choice in most coatings formulations is $TiO_2$, which is effective for creating opacity, but expensive. The expense can be mitigated somewhat by functionalizing the binder with phosphate groups to promote adsorption of the binder particles to TiO2 particles to form composites with increased spacing between the pigment particles, thereby providing a mechanism for reducing the levels of expensive TiO2 to achieve the same degree of hiding.

Especially attractive binders for architectural coatings are vinyl acetate polymers and copolymers, which are known to have high scrub resistance at relatively low cost. Vinyl acetate polymers functionalized with phosphate groups are especially desirable as film-forming polymers due to the cost benefits provided by reduced $TiO_2$ usage. Cost benefits of vinyl acetate based paints are further realized in above critical PVC paint formulations, which are widely used in spite of their relatively poor performance. It would be desirable to improve performance, particularly hiding (opacity), in these above-critical vinyl acetate based paint formulations economically.

SUMMARY OF THE INVENTION

The present invention addresses a need in the art by providing a coating composition comprising an aqueous dispersion of polymer particles, pigment particles, and extender particles wherein the polymer particles comprise, in a single phase and based on the weight of the polymer particles, from 80 to 99.8 weight percent structural units of vinyl acetate and from 0.1 to 6 weight percent structural units of a phosphorus acid monomer or a salt thereof, wherein the polymer particles have a particle size by dynamic light scattering of from 80 nm to 500 nm, and wherein the coating composition has an above-critical pigment volume concentration. The present invention addresses a need in the art by economically improving hiding in above-critical PVC vinyl acetate based paint formulations without adversely impacting other desirable properties in the coating.

DETAILED DESCRIPTION OF THE INVENTION

The present invention is a coating composition comprising an aqueous dispersion of polymer particles, pigment particles, and extender particles wherein the polymer particles comprise, in a single phase and based on the weight of the polymer particles, from 80 to 99.8 weight percent structural units of vinyl acetate and from 0.1 to 6 weight percent structural units of a phosphorus acid monomer or a salt thereof, wherein the polymer particles have a particle size by dynamic light scattering of from 80 nm to 500 nm, and wherein the coating composition has an above-critical pigment volume concentration.

As used herein, the term "in a single phase" refers to the fact that the polymer particles comprise one or more copolymers comprising structural units of vinyl acetate and the phosphorus acid monomer with the described proportions.

As used herein, the term "extender particles" refer to inorganic materials that are used to increase the pigment volume concentration of the coating composition. Extender particles are generally distinguished from pigment particles by their lower index of refraction (typically from 1.3 to 1.6 as compared to above 2.0 for pigments). Examples of suitable extenders include, calcium carbonate, clays, aluminum silicates, silica, calcium silicates, mica, talc, and nephilene syenite.

As used herein, the term "structural units" refers to the remnant of the recited monomer after polymerization. For example, a structural unit of vinyl acetate is as illustrated:

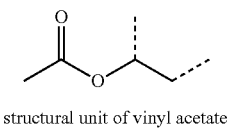

structural unit of vinyl acetate where the dotted lines represent the points of attachment of the structural unit to the polymer backbone. Preferably, the concentration of structural units of vinyl acetate is from 85, more preferably from 90 weight percent, to preferably 98 weight percent based on the weight of the polymer particles.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates and methacrylates, including phosphoethyl methacrylate and phosphopropyl methacrylate, with phosphoethyl methacrylate or a salt thereof being especially preferred. A preferred phosphonate is 2-(methacryloyloxy)ethyl phosphonic acid or a salt thereof.

"Phosphoethyl methacrylate" (PEM) is used herein to refer to the following structure:

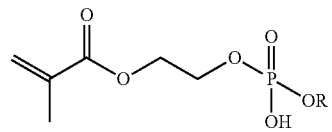

where R is H or

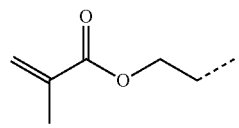

where the dotted line represents the point of attachment.

A preferred concentration of structural units of the phosphorus acid monomer, preferably PEM, is from 0.2 to 4, more preferably to 2 weight percent, based on the weight of the polymer particles.

The polymer particles preferably comprise 0.1 to 2 weight percent, based on the weight of the polymer particles, structural units of a sulfur acid monomer or a salt thereof.

Examples of suitable sulfur acid monomers include sulfoethyl methacrylate, sulfopropyl methacrylate, vinyl sulfonic acid, 2-acrylamido-2-methyl propanesulfonic acid, and 2-methacrylamido-2-methyl propanesulfonic acid, and salts thereof. Preferred sulfur acid monomers are 2-acrylamido-2-methyl propanesulfonic acid and vinyl sulfonic acid, and salts thereof. The polymer particles more preferably comprise 0.5 to 1.5 weight percent, based on the weight of the polymer particles, structural units of 2-acrylamido-2-methyl propanesulfonic acid or a salt thereof.

The polymer particles may also include up to 19.9 weight percent structural units of one or more acrylate or methacrylate monomers, such as ethyl acrylate, butyl acrylate, 2-ethylhexyl acrylate, methyl methacrylate, or butyl methacrylate, or combinations thereof. Preferably, the polymer particles contain less than 10 weight percent structural units of one or more acrylate monomers, more preferably not more than 5 weight percent, and most preferably no structural units of acrylate monomers.

In another embodiment, the polymer particles can also include from 0.1, preferably from 0.5 weight percent, to 19.9, more preferably to 10, more preferably to 5, and most preferably to 3 weight percent structural units of a vinyl ester of a branched alkyl carboxylic acid (also known as a vinyl versatate), based on the weight of the polymer particles. An example of a commercially available vinyl versatate is VA-VeoVa 10 monomer.

The polymer particles preferably adsorb to the surface of the pigment particles. For example, when $TiO_2$ is blended with a VA-PEM latex, adsorption can be seen by way of scanning electron microscopy or centrifugation. As used herein, "adsorb" refers to polymer particles contacting or attaching to the surface of the $TiO_2$ particles in a manner other than covalent bonding. Preferably the $T_g$ of the polymer particles by the Fox equation is at least 25° C. and preferably not more than 50° C., more preferably not more than 40° C. Preferably, the polymer particles have a particle size by dynamic light scattering of not less than 100 nm, more preferably not less than 150 nm, more preferably not less than 250 nm, and most preferably not less than 350 nm to not greater than 450 nm.

The aqueous dispersion of polymer particles is preferably prepared by forming an at least partially neutralized solution of the phosphorus acid monomer, then contacting the solution with vinyl acetate and optionally the sulfur acid monomer, or salt thereof and optionally the vinyl ester of the alkyl carboxylic acid under emulsion polymerization conditions. As used herein, the term "at least partially neutralized phosphorus acid monomer" refers to an aqueous solution of a phosphorus acid monomer containing not less than ½ the molar amount of neutralizing agent required to neutralize the monomer, up to the amount required to completely neutralized the monomer, preferably up to the amount required to reach a pH equal to the highest $pK_a$ (preferably the second $pK_a$) of the monomer. For example, if the neutralizing agent is ammonia, and the phosphorus acid monomer is PEM, the suitable molar ratio of ammonia to PEM would be at least 1:1 and preferably up to 2:1. Suitable neutralizing agents include, for example, ammonia, KOH, NaOH, ethanol amine, and aminomethyl propanol. It is preferred that pH of the aqueous solution of the phosphorus acid monomer, prior to contact with the vinyl acetate and optionally one or more additional monomers, be in the range of from 4.5, more preferably from 5.0, most preferably from 5.5; to 8.0, more preferably to 7.5, and most preferably to 7.2. The pH of the polymerization medium is maintained at such a level to minimize the hydrolysis of the vinyl acetate monomer or of the polymer, and is preferably buffered throughout the polymerization process to maintain a pH in the range of from 4.5, more preferably from 5.5; to 8, more preferably to 7. Because the polymerization reaction is carried out at a pH that does not promote the hydrolysis of vinyl acetate, very low levels of acetic acid or a salt thereof (i.e., the hydrolysis products of vinyl acetate) are formed during the polymerization process. Consequently, yields of useful polymer are improved, VOCs are reduced, and production of a less desirable hydrophilic polymer (due to generation of pendant OH groups as a consequence of hydrolysis) is reduced.

In a first step of preparing the composition of the present invention the stable aqueous dispersion of the polymer particles is contacted with pigment particles, preferably an aqueous dispersion of pigment particles (also known as a slurry), more preferably a $TiO_2$ slurry, to form the aqueous dispersion of polymer particles that preferably adsorb to the surface of the pigment particles. The aqueous dispersion of polymer particles is advantageously adjusted to a pH in the range of 8 to 10 before, during, or after contacting the pigment particles, preferably an aqueous dispersion of $TiO_2$ particles, to form the composite of polymer particles and the pigment particles. This combination can then be admixed with extender particles to form the above critical PVC composition.

Furthermore, the stable aqueous dispersion of polymer particles can be combined with extender first and this mixture can be combined with the pigment particles, preferably as an aqueous dispersion. Also, the extender particles can be combined with pigment particles, preferably as an aqueous dispersion, which can then be admixed with the aqueous dispersion of polymer particles (i.e., the latex).

In above critical PVC paints there is a relatively low concentration of opacifying pigment and it is well known that a large proportion of the opacity (or hiding) comes from air voids that are present due to the absence of adequate film forming binder to encapsulate the entirety of the pigments and extenders present in the formulation. Optimizing opacity in low pigment content coatings is especially important to maintaining the low cost advantage of these types of formulations.

The term "critical pigment volume concentration" (CPVC) refers to the lowest concentration of polymer required to wet the surface of the pigment particles. Below CPVC there is an excess amount of polymer relative to the amount of pigments and extenders. As such, at PVCs at or below CPVC, an adequate relative amount of binder volume to pigment/extender volume is present, leading to a substantially nonporous dry coating.

Above CPVC, the volume of binder is insufficient to coat all pigment and extender to form a porous dry coating, resulting in a deterioration of the properties and performance of the consequent coating. For example, abrasion resistance and stain resistance and removal are superior for coatings at or below CPVC as compared to coatings above CPVC. Nevertheless, the cost advantages of above-CPVC paints sometimes outweigh the disadvantages of diminished properties.

The CPVC of a coating can be conveniently determined using reflectance (integrated sphere, spectral reflectance included, 10 degree observer/D65), as follows: The difference in reflectance of a coated film in the dry state is compared to the same film that has been rewetted with a penetrating solvent that has refractive index similar to that of the polymer (such as Isopar L solvent) that fills the air voids of the dry coating. When a coating is above CPVC, the Y-reflectance of the re-wetted coating will decrease by at least 2% from the initial Y-reflectance value of the dry coating. Preferably, the above-critical PVC is at least 60, more preferably at least 65, and preferably not greater than 90.

It has surprisingly been discovered that hiding is improved in above-critical paint formulations with an increase in binder particle size; in contrast, for below-critical paint formulations, the relationship between particle size and hiding is inverse: higher particle sizes result in reduced hiding.

| Abbreviations | |
|---|---|
| Abbreviation | Chemical name or description (%'s in water are indicated) |
| FES-32 | Disponil FES-32 fatty ether sulfate (30% aq) |
| PEM | Phosphoethyl methacrylate, 60% active |
| NaPS | Sodium persulfate |
| FES-77 | Disponil FES-77 fatty ether sulfate (33% aq) |
| 15-S-40* | TERGITOL ™ Secondary Alcohol Ethoxylate (70% aq) |
| TMN-10 | TERGITOL ™ TMN-10 |
| DS-4 | Rhodacal DS-4 sodium dodecylbenzene sulfonate (22% aq) |
| Na-AMPS | Sodium 2-acrylamido-2-methyl-1-propanesulfonate (50% aq) |
| BA | Butyl acrylate |
| VA | Vinyl acetate |
| IAA | Isoascorbic acid |
| t-BHP | t-Butyl hydroperoxide |
| PS | Particle Size |
| $TiO_2$ slurry | Ti-Pure R-746 $TiO_2$ slurry |
| Natrosol | Natrosol 250 MHR |
| Natrosol soln | Natrosol 250 MHR (3% in water) |
| CF-10* | TRITON ™ CF-10 Surfactant |
| Foamaster | Foamaster VL Defoamer |
| Texanol | Texanol Coalescent |
| $TiO_2$ PVC | $TiO_2$ Pigment Volume Concentration in the Paint |
| 731A | TAMOL ™ 731A Dispersant |

*TAMOL, CELLOSIZE, and TERTIGOL are Trademarks of The Dow Chemical Company or its Affiliates.

COMPARATIVE EXAMPLE 1

Preparation of BA/VA/PEM/AMPS Latex

Deionized (DI) water (654 g) was added to a 5-L 4-necked round bottom flask equipped with a mechanical stirrer, nitrogen gas blanket, thermometer, condenser, heating mantel and temperature controller and heated to 71° C. under nitrogen atmosphere. Next, $Cu(NO_3)_2$ (1% aq, 0.85 g) and 51.9 g of seed polymer (32.85% in water, 41nm) were added to the reactor. The monomer emulsion was prepared by first mixing DI water (335.9 g) and PEM (8.5 g) in a vessel and adjusting the pH to 6.8 with NaOH (50% aq, 5.3 g). FES-77 (27.4 g), 15-S-40 (49.9 g), 15-S-9 (17.1 g) and DS-4 (32.6 g) were then added followed by BA (570 g), VA (1117 g) and Na-AMPS (19.2 g). An initiator solution was prepared separately by mixing DI water (58 g), t-BHP (1.5 g) and NaPS (2.3 g). A separate solution of DI water (50 g), NaOH (50% aq, 1.0 g) and IAA (2.3 g) was prepared. Flow of the monomer emulsion as well as the NaPS/tBHP and IAA solutions to the reactor flask were started at the same time. The monomer emulsion was added over 120 min while the tBHP/NaPS solution and the IAA solution were added over 155 minutes. After the monomer emulsion, initiator solution and IAA solution additions were complete a redox pair was added to reduce residual monomers. The reaction was maintained at 72.5° C. for the duration of the entire reaction (4 h total), after which time the latex was cooled to and a biocide added. The pH of the final latex was adjusted to 6.3 with aq. $NH_3$. Water was added to adjust to the listed solids.

EXAMPLE 1

Preparation of VA/PEM/AMPS Latex

Example 1 was prepared substantially as described for Comparative Example 1 except that 104 g of polymer seed (32.85% in water, 41 nm PS) was used and the monomer emulsion was prepared by first mixing DI water (370 g) and PEM (8.5 g) in a vessel and adjusting the pH to 6.8 with NaOH (5.3 g). FES-77 (27.4 g), 15-S-40 (49.9 g), 15-S-9 (17.1) and DS-4 (32.6 g) were then added followed by Na-AMPS (19.1 g) and VA (1687 g).

EXAMPLE 2

Preparation of VA/VeoVa/ AMPS/PEM

Example 2 was prepared substantially as described for Comparative Example 1 except that 104 g of polymer seed (32.85% in water, 41nm PS) was used and the monomer emulsion was prepared by first mixing DI water (369 g) and PEM (34.1 g) in a vessel and adjusting the pH to 6.8 with NaOH (16.7 g). FES-77 (27.4 g), 15-S-40 (49.9 g), 15-S-9 (17.1) and DS-4 (32.6 g) were then added followed by Na-AMPS (19.1 g), VeoVa 10 monomer (43.6 g) and VA (1687 g).

EXAMPLE 3

Preparation of VA/PEM/AMPS Latex

Example 3 was prepared substantially as described for Comparative Example 1 except that 104 g of polymer seed (32.85% in water, 41 nm PS) was used and the monomer emulsion was prepared by first mixing DI water (370 g) and PEM (34.1 g) in a vessel and adjusting the pH to 6.8 with NaOH (50% aq, 16.9 g). FES-77 (27.4 g), 15-S-40 (49.9 g), 15-S-9 (17.1) and DS-4 (32.6 g) were then added followed by Na-AMPS (19.1 g) and VA (1661 g).

The particle sizes (determined using a Brookhaven BI90 particle size analyzer) and $T_g$ (calculated using the Fox equation) of the latex binder compositions are shown in Table 1.

TABLE 1

VA/BA/PEM Latex Compositions

| Binder Ex. | Binder Monomer Composition | PS (nm) | $T_g$ (° C.) |
|---|---|---|---|
| Comp 1 | VA/BA/AMPS/PEM 65/33.9/0.6/0.5 | 207 | −4.9 |
| 1 | VA/BA/AMPS/PEM 98.9/0/0.6/0.5 | 174 | 29.7 |
| 2 | VA/Veova-10/AMPS/PEM 95.5/2.5/0.6/2.0 | 291 | 29.6 |
| 3 | VA/BA/AMPS/PEM 97.4/0/0.6/2.0 | 434 | 30.5 | a - % PEM is uncorrected for active amount, which is ~60% of the reported percentage Above-critical PVC Paint Formulations An above critical PVC paint (60.6 PVC (total) was prepared using the following procedure:

Binder emulsion was added to a paint container and mixed using a 3-blade pitched metal stirrer; aqueous ammonia (28% aq) was added to neutralize the binder to a pH of 8-9. After the addition of the base was complete, $TiO_2$ and Defoamer were added sequentially to the emulsion. In a separate container the mill based (part B) was prepared on a Cowles disperser. After preparation, the mill based was added to part A while mixing. Finally, Part C was added in order to the mixture of Part A and Part B while mixing. Adequate level of thickener was added until a Krebs Unit viscosity of 90-100 was obtained.

Method for Reflectance Measurement

Both dry coating samples and Iso-Par L re-wetted coating samples were measured for Y-reflectance using a Xrite USA model Xrite8400, XriteColor Master CM-2 using the spectral component included mode and under D65/10° observer conditions. The Iso-par L oil was applied to the dry coating using a 1-inch nylon paint brush and allowed to penetrate for 5 min prior to making reflectance measurements. Table 2 shows the ingredients and amounts used to make Paint Formulation 1.

TABLE 2

Above-Critical Paint Formulation 1 (60.6 PVC)

Part A

| Binder Emulsion | Sufficient to obtain 39.4% by vol based on total dry vol of binder, pigment, and extender |
|---|---|
| $NH_3$ (28% aq) | Sufficient achieve pH of 8-9 |
| $TiO_2$ slurry | 76.0 g |
| CF-10 | 0.52 g |
| Foamaster | 0.52 g |
| Mill base part B | g |

| Natrosol | 2.95 g |
|---|---|
| Water | 164.2 g |
| CF-10 | 0.80 g |
| Foamaster | 0.80 g |
| $NH_3$ (28% aq) | 0.08 g |
| 731A | 9.73 g |
| Omyacarb 5 extender | 90.00 g |
| Minex 10 extender | 48.00 g |
| Optiwhite extender | 48.00 g |

| Grind Sub-total | 364.60 g |
|---|---|

Part C

| Texanol | 10% based on binder $T_g$ |
|---|---|
| Natrosol soln | sufficient to achieve 90-100 KU viscosity |
| Water | sufficient to achieve 34.8% volume solids |

A second above critical PVC paint (Paint Formulation 2, 70.0 PVC (total) was prepared using the procedure substantially described to make Paint Formulation 1. Table 3 shows the ingredients and amounts used to make Paint Formulation 2.

TABLE 3

Above-Critical Paint Formulation 2 (70.0 PVC)

Part A

| Binder Emulsion | Sufficient to obtain 30% vol based on total dry vol of binder, pigment, and extender |
|---|---|
| $NH_3$ (28% aq) | Quantity to achieve pH of 8-9 |
| $TiO_2$ slurry | 72.8 g |
| CF-10 | 0.5 g |
| Foamaster | 0.5 g |
| Mill base part B | g |

| Natrosol | 3.35 g |
|---|---|
| Water | 186.0 g |
| CF-10 | 0.91 g |
| Foamaster | 0.91 g |
| $NH_3$ (28% aq) | 0.09 g |
| 731A | 11.02 g |

TABLE 3-continued

Above-Critical Paint Formulation 2 (70.0 PVC)

| Omyacarb 5 extender | 101.92 g |
|---|---|
| Minex 10 extender | 54.36 g |
| Optiwhite extender | 54.36 g |

| Grind Sub-total | 412.45 g |
|---|---|

Part C

| Texanol ( ) | 10% based on binder $T_g$ |
|---|---|
| Natrosol soln | sufficient to achieve 90-100 KU viscosity |
| Water | sufficient to achieve 33.3% volume solids |

Kubelka-Munk S/Mil Test Method

The paints were evaluated for hiding using the in accordance with the Kubelka-Munk S/mil test method, as described in the following procedure.

Four draw-downs were prepared on Black Release Charts (Leneta Form RC-BC) for each paint using a 1.5-mil Bird draw down bar and the charts allowed to dry overnight. Using a template, 3.25"×4" rectangles were cut out on each chart. The Y-reflectance was measured using a X-Rite Color i7 Spectrophotometer in each of the scribed areas five times and the average Y-reflectance recorded. A thick film draw down was prepared for each paint on the Black Release Charts using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \qquad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 $in^2$.

$$X(\text{mils}) = \frac{W_{pf}(g) \times 1000(\text{mil/in})}{D(\text{lbs/gal}) \times 1.964(g/in^3/\text{lbs/gal}) \times A(\text{in})}$$

Table 4 shows the effect of particle size and $T_g$ on hiding for the 60.6 PVC and 70 PVC paint formulations (Paint Formulation 1 and Paint Formulation 2 respectively).

TABLE 4

Hiding Data for Above-Critical PVC Paint Formulations 1 and 2

| Binder Example No. | Comp. 1 | 1 | 2 | 3 |
|---|---|---|---|---|
| PS (nm) | 207 | 174 | 291 | 434 |
| $T_g$ (° C.) | −4.9 | 29.7 | 29.6 | 30.5 |
| Dry S/mil Formulation 1 | 5.59 | 5.93 | 6.04 | 6.62 |
| std deviation | 0.02 | 0.05 | 0.01 | 0.04 |
| Dry S/mil Formulation 2 | 6.95 | 7.44 | 7.61 | 7.99 |
| std deviation | 0.01 | 0.05 | 0.13 | 0.05 |

As the data show, the effect of $T_g$ on hiding is dramatic for the above-critical paint formulations. Hiding increases as particle size increases from 174 nm to 434 nm.

The invention claimed is:

1. A coating composition comprising an aqueous dispersion of polymer particles, pigment particles, and extender particles wherein the polymer particles comprise, in a single phase and based on the weight of the polymer particles, greater than 80 up to 99.8 weight percent structural units of vinyl acetate; from 0.1 to 6 weight percent structural units of a phosphorus-containing acid monomer or a salt thereof; and from 0.1 to 2 weight percent structural units of a sulfur-containing acid monomer or a salt thereof; wherein the polymer particles have a particle size by dynamic light scattering of from greater than 350 nm to 500 nm, and wherein the coating composition has an above-critical pigment volume concentration, as determined by reflectance, wherein the phosphorus-containing acid monomer or salt thereof is a dihydrogen phosphate esters of an alcohol in which the alcohol contains or is substituted with a polymerizable vinyl or olefinic group.

2. The coating composition of claim 1 wherein the particle polymers comprise, based on the weight of the polymer particles, from 85 to 98 weight percent structural units of vinyl acetate and from 0.2 to 2 weight percent of the phosphorus-containing acid monomer or a salt thereof; wherein the phosphorus-containing acid monomer is phosphoethyl methacrylate.

3. The coating composition of claim 2 wherein the particle polymers comprise, from 90 to 98 weight percent structural units of vinyl acetate and from 0.2 to 2 weight percent structural units of phosphoethyl methacrylate or a salt thereof, based on the weight of the polymer particles.

4. The coating composition of claim 3 wherein the sulfur-containing acid monomer is selected from the group consisting of sulfoethyl methacrylate, sulfopropyl methacrylate, vinyl sulfonic acid, a salt of vinyl sulfonic acid, 2-acrylamido-2-methyl propanesulfonic acid, a salt of 2-acrylamido-2-methyl propanesulfonic acid, 2-methacrylamido-2-methyl propanesulfonic acid, and a salt of 2-methacrylamido-2-methyl propanesulfonic acid.

5. The coating composition of claim 3 wherein the sulfur-containing acid monomer is 2-acrylamido-2-methyl propanesulfonic acid or vinyl sulfonic acid or salts thereof.

6. The coating composition of claim 4 wherein the polymer particles further comprises from 0.5 to 5 weight percent of structural units of a vinyl versatate.

7. The coating composition of claim 1 wherein the polymer particles have a $T_g$ as calculated by the Fox equation of from 25 °C. to 40 °C., wherein the polymer particles have a particle size by dynamic light scattering of from greater than 350 nm to 450 nm.

8. The coating composition of claim 7 wherein the pigment volume concentration of the composition is from 60 to 90.

* * * * *